(12) United States Patent
Brady et al.

(10) Patent No.: US 7,735,842 B2
(45) Date of Patent: Jun. 15, 2010

(54) SANITARY HANDLE COVER DISPENSER WITH TOUCH-FREE ADVANCE FOR USE WITH SHOPPING CARTS

(75) Inventors: Dawn Brady, 2011 NE. 55th St., Fort Lauderdale, FL (US) 33308; Michael M. Anthony, Coral Springs, FL (US)

(73) Assignee: Dawn Brady, Fort Lauderdale, FL (US)

( * ) Notice: Subject to any disclaimer, the term of this patent is extended or adjusted under 35 U.S.C. 154(b) by 314 days.

(21) Appl. No.: 11/820,055

(22) Filed: Jun. 18, 2007

(65) Prior Publication Data

US 2008/0000924 A1 Jan. 3, 2008

Related U.S. Application Data

(63) Continuation-in-part of application No. 11/478,196, filed on Jun. 29, 2006, now abandoned.

(51) Int. Cl.
*B62D 39/00* (2006.01)
(52) U.S. Cl. .................................. 280/33.992; 16/904
(58) Field of Classification Search ............ 280/33.992; 16/904
See application file for complete search history.

(56) References Cited

U.S. PATENT DOCUMENTS

| | | | | | |
|---|---|---|---|---|---|
| 2,903,734 | A | * | 9/1959 | Inman | 16/437 |
| 5,836,051 | A | * | 11/1998 | Myers | 16/436 |
| 6,412,679 | B2 | * | 7/2002 | Formon et al. | 225/14 |
| 6,491,996 | B2 | * | 12/2002 | Digangi | 428/43 |
| 6,869,085 | B2 | * | 3/2005 | Pettigrew et al. | 280/33.992 |
| 7,281,718 | B2 | * | 10/2007 | Malchow | 280/33.992 |
| 2002/0165778 | A1 | * | 11/2002 | O'Hagan et al. | 705/14 |

FOREIGN PATENT DOCUMENTS

JP 06009021 A * 1/1994

* cited by examiner

*Primary Examiner*—S. Joseph Morano
*Assistant Examiner*—John D Walters
(74) *Attorney, Agent, or Firm*—Mark D. Bowen, Esq.; Malin Haley DiMaggio Bowen & Lhota, P.A.

(57) ABSTRACT

A sanitary cover dispensing apparatus for use with a shopping cart that is adapted to provide a fresh disposable portion of sanitary sheet material over the shopping cart handle using an electronic advance system actuated by a touch-free sensor. The sanitary handle cover dispenser comprises a housing containing a roll of sanitized paper of plastic sheet material wound about a rotatable reel mechanism and adapted to deploy a fresh portion of sanitized sheet material in covering relation with the shopping cart handle between uses. A reel mechanism is electrically driven and actuated by a touch-free sensor upon sensing the presence of a user's hand in proximity to the sensor. The sanitary sheet material is preferably adapted with advertising content. The dispenser is further adapted with an electronic display and wireless communication functions that enable the device to receive and display information directly to the user. Such features allow the user to send an e-mail message, such as shopping list, to the store such that the message may be relayed to the device upon the user's arrival and log in.

6 Claims, 19 Drawing Sheets

Credit card size Ads are printed on rolls.

Rolls are transported to the Ad-roll units and installed.

After use, the rolls are discarded for recycling.

*Fig. 18*

Business method

1. Consumers pay for ads.

2. Grocery stores get ad-roll for a minimal or no fee.

3. Consumers and shopping center benefit from sanitized cart handles.

4. Ad-rolls are replaced free of charge to consumer and shopping center.

*Fig. 19*

SANITARY HANDLE COVER DISPENSER WITH TOUCH-FREE ADVANCE FOR USE WITH SHOPPING CARTS

CROSS REFERENCE TO RELATED APPLICATIONS

This application is a continuation-in-part of U.S. patent application Ser. No. 11/478,196, filed Jun. 29, 2006.

STATEMENT REGARDING FEDERALLY SPONSORED RESEARCH OR DEVELOPMENT

N/A

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office patent file or records, but otherwise reserves all copyrights rights whatsoever.

BACKGROUND OF THE INVENTION

1. Field of the Invention

The present invention relates to shopping cart handles, and more specifically to an apparatus for attachment to a shopping cart handle for providing a sanitary handle cover manufactured from a hypoallergenic, non-toxic material to prevent the spread of disease and germs from one user to the next.

2. Description of Related Art

The development and use of shopping carts in retail outlets, such as supermarkets and department stores, has greatly simplified shopping for the consumer. The shopping cart allows consumers to pick up a plurality of desired items for purchase and place them in the cart, while keeping their hands free and affording them mobility to move through the store while shopping.

A significant problem associated with shopping carts, as with any item frequently handled by numerous members of the public, involves the accumulation of germs, namely bacteria and other skin-borne infectious agents on shopping cart handles. Each successive shopper handling the cart comes into contact with the germs of the prior shopper, and further deposits his own germs.

For example, while shopping in a grocery store, shoppers often touch the merchandise prior to purchase. While the shopper may not actually purchase the merchandise, the merchandise has nevertheless been handled. Thus, an individual who has a highly communicable disease and has been pushing a shopping cart around may have endless possibilities of transmitting the communicable disease to the merchandise as well as the shopping cart, particularly the shopping cart handle. Similarly, communicable disease may be transmitted from person to person by successive use of a shopping cart, and touching of the handle, by multiple users.

To remedy this situation, the store itself could sanitize the handle of each shopping cart after each use thereof. This however, would be an unrealistic solution, as several customers handle each of the store's scores of shopping carts daily, and to implement such a sanitation program would be costly and time-consuming for the store. It is therefore upon the germ-conscious individual to solve this problem. Thus, the shopper is forced to bring something to wipe off the handle of the shopping cart prior to using a particular shopping cart, or alternatively to wear some type of gloves while shopping.

As a result of these significant health concerns, the prior art reveals at least one attempt directed to providing a sanitary handle device. U.S. Pat. No. 2,903,734, issued to Inman, discloses a sanitary handle device for a cart or carriage for dispensing clean or fresh paper over the handle so that the handle is kept clean and sanitary. The Inman device advances new sections of paper using a lever (48) that projects upward from the device. Actuation of the lever requires that the user manually grasp and actuate lever thereby exposing the user to infectious matter on the lever thus essentially defeating the purpose.

Accordingly, there exists a need for a sanitary attachment for shopping cart handles that prevents the transmission of communicable disease and germs.

BRIEF SUMMARY OF THE INVENTION

The present invention overcomes the limitations and disadvantages in the art by providing a sanitary cover dispenser for shopping cart handles that provides a fresh disposable portion of sanitary sheet material over the shopping cart handle. In accordance with the present invention, a sanitary handle cover dispenser is provided for attachment to the handle of a shopping cart. The sanitary handle cover dispenser comprises a housing containing a roll of sanitized paper of plastic sheet material wound about a rotatable reel mechanism and adapted to deploy a fresh portion of sanitized sheet material in covering relation with the shopping cart handle between uses. In a preferred embodiment, the reel mechanism is electrically driven and actuated by a touch-free sensor upon sensing the presence of a user's hand in proximity to the sensor. The sanitary sheet material is preferably adapted with advertising content. The dispenser is further adapted with an electronic display and wireless communication functions that enable the device to receive and display information directly to the user. These features allow the user to send an e-mail message, such as shopping list, to the store such that the message may be relayed to the device upon the user's arrival and log in.

Accordingly, it is an object of the present invention to provide an apparatus that prevents the transmission of disease and germs by deployment of sanitized material in covering relation with a shopping cart handle.

Another object of the present invention is to provide an apparatus that prevents the transmission of disease and germs by automatic deployment of sanitized material in covering relation with a shopping cart handle between uses.

Yet another object of the present invention is to provide such an apparatus wherein the sanitized sheet material incorporates advertising content.

A further object of the present invention is to provide such an apparatus adapted for selectively advancing a fresh portion of sanitized material using a touch-free motorized advance mechanism.

Yet another object of the present invention is to provide such a device that is adapted for wireless communications and a display screen to allow for communications and messages to be sent to the user.

In accordance with these and other objects, which will become apparent hereinafter, the instant invention will now be described with particular reference to the accompanying drawings.

BRIEF DESCRIPTION OF THE SEVERAL VIEWS OF THE DRAWINGS

FIGS. 18 and 19 are block diagrams depicting further functional aspects and benefits of the invention.

DETAILED DESCRIPTION OF THE INVENTION

Figure 1:
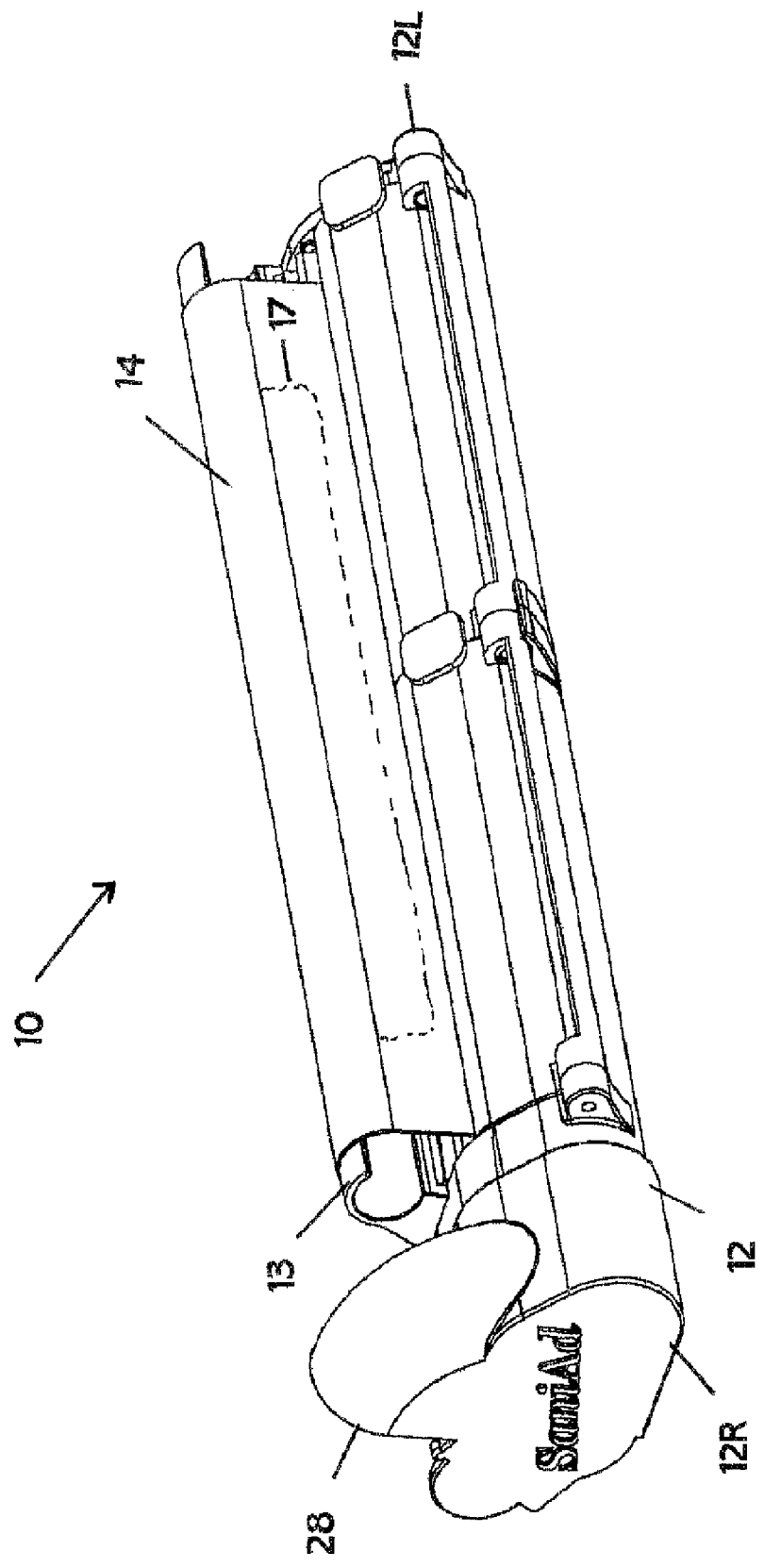
FIG. 1 is a perspective view of a sanitary handle cover dispenser in accordance with the present invention for use with a conventional shopping cart.
Figure 2:
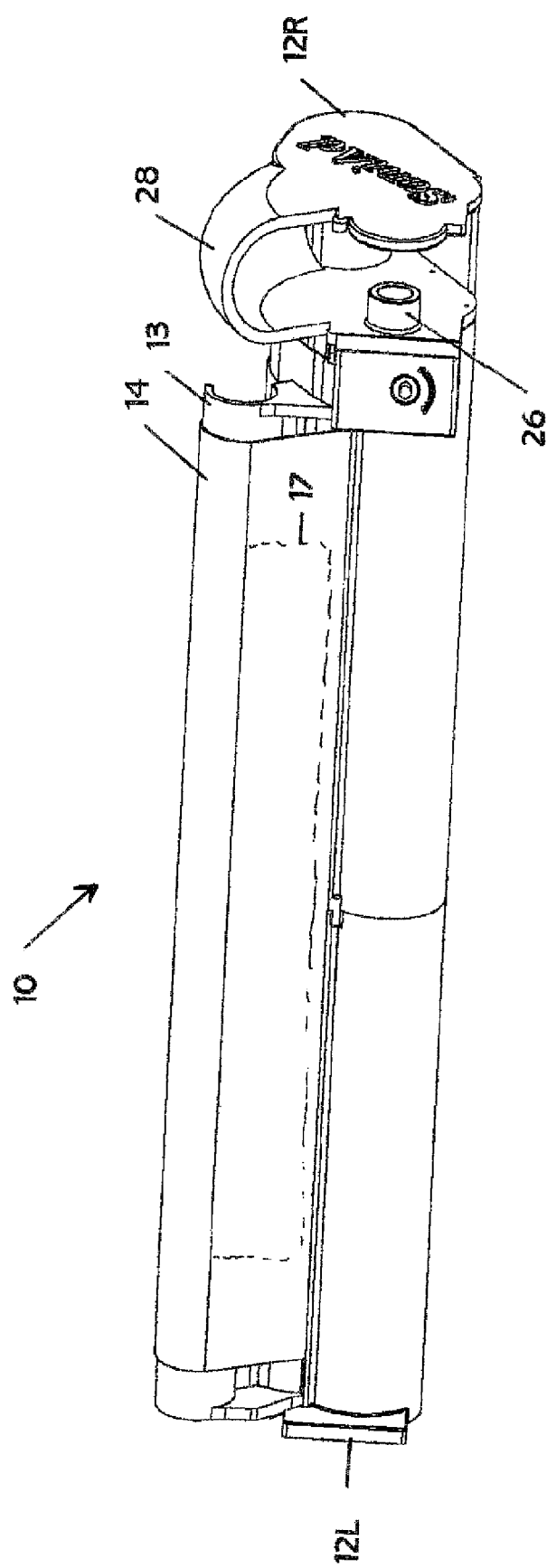
FIG. 2 is a front view thereof.
Figure 3:
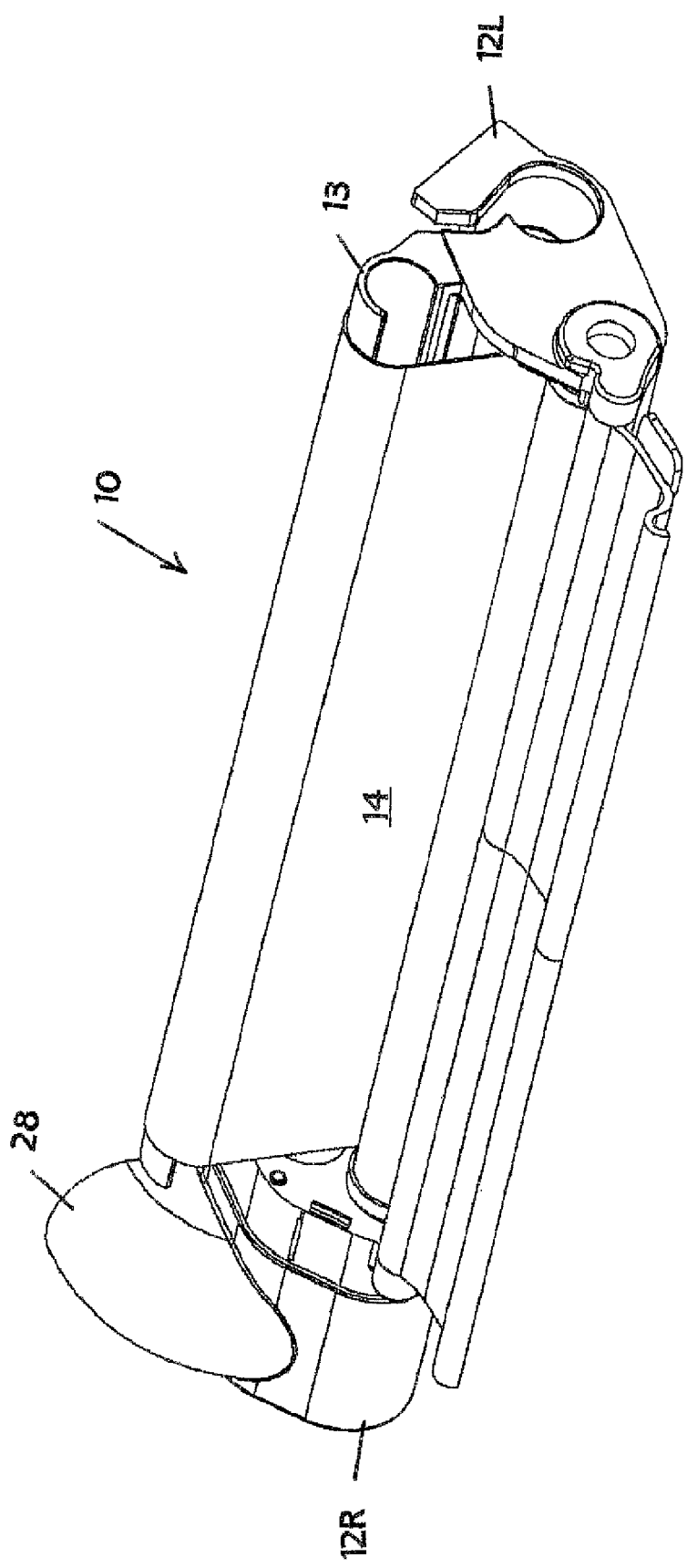
FIG. 3 is a rear view thereof.

With reference now to the drawings, FIGS. 1-19 depict a preferred embodiment of a sanitary handle cover dispenser, generally referenced as 10, for shopping carts. Sanitary handle cover dispenser 10 comprises an attachable assembly that provides a fresh disposable surface over the shopping cart handle by dispensing sanitary sheet material in covering relation with the handle. In accordance with a preferred embodiment of the present invention, sanitary handle cover dispenser 10 comprises a housing 12 containing a roll of sanitized sheet material 14 wound about a supply reel 16 and collected by a receiving reel 18. When operatively installed on a shopping cart, dispenser 10 is adapted to deploy a fresh portion of sanitized paper 14 in covering relation with the shopping cart handle between uses. In addition, the sheet material may be adapted with generally U-shaped perforations 17, inverted relative to the user pushing the cart by the handle, to allow the user to push through and form a conventional grip around the shopping cart handle with a layer of sheet-like material sandwiched between the handle and the user's hand.

Figure 8:
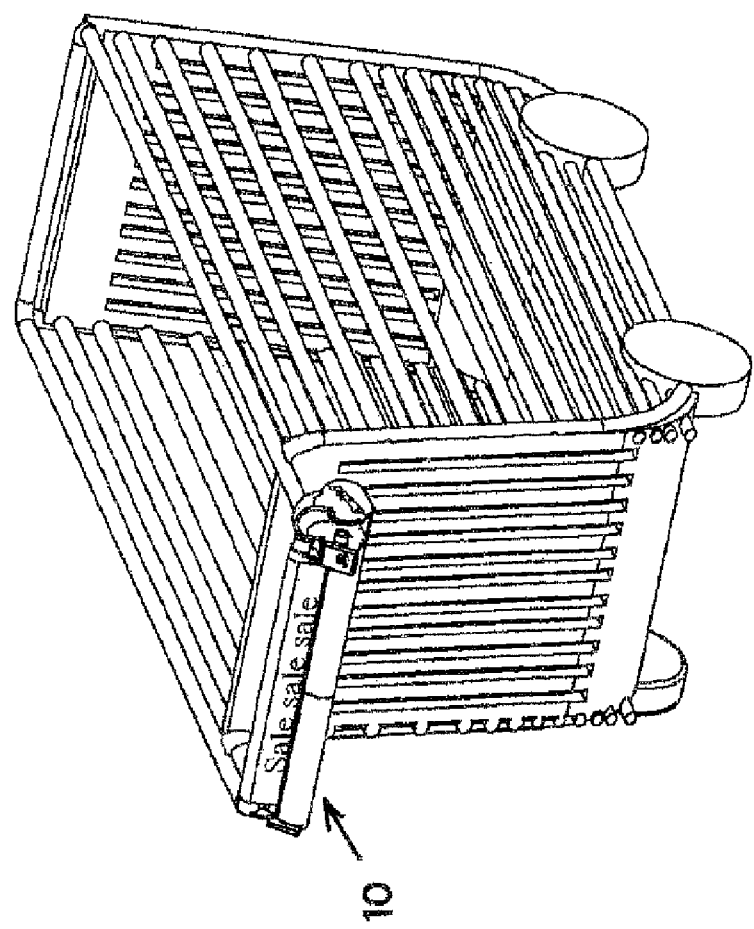
Figure 9:
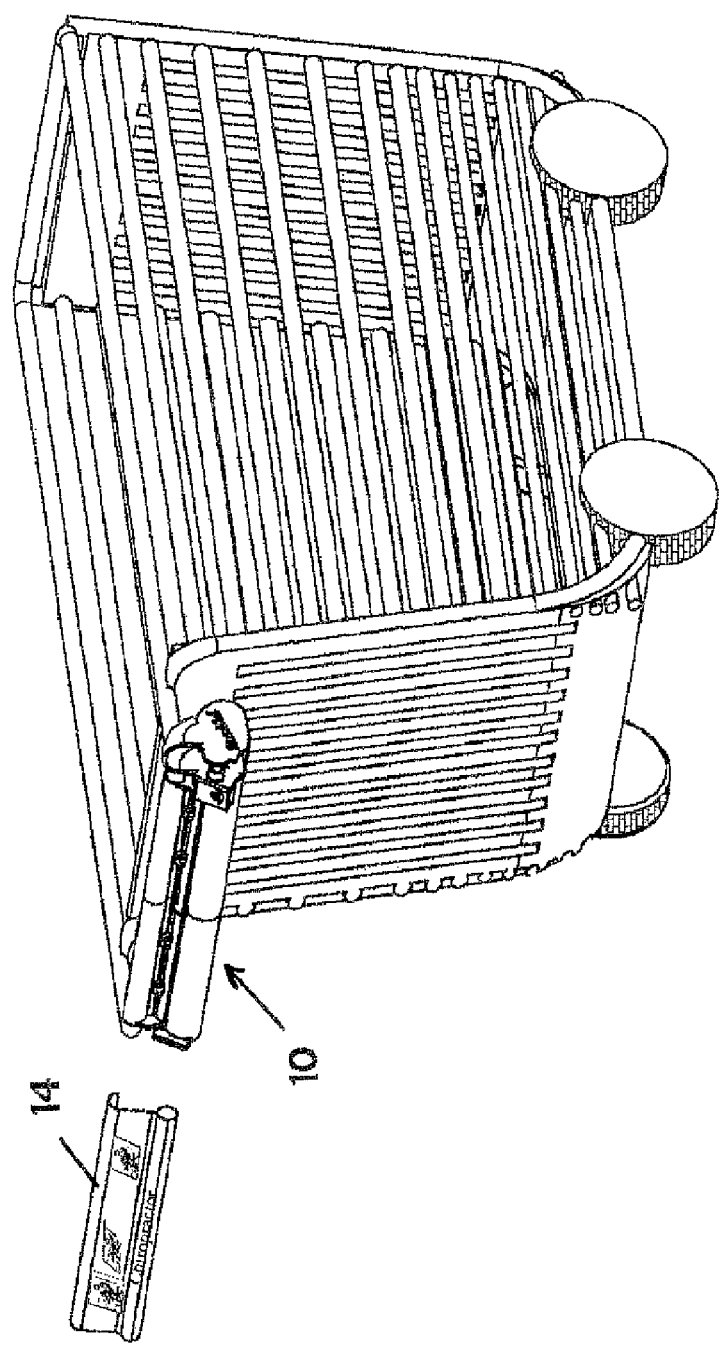
FIG. 9 is a perspective view of a sanitary handle cover dispenser installed on a shopping cart with the sanitary sheet material in exploded relation.
Figure 10:
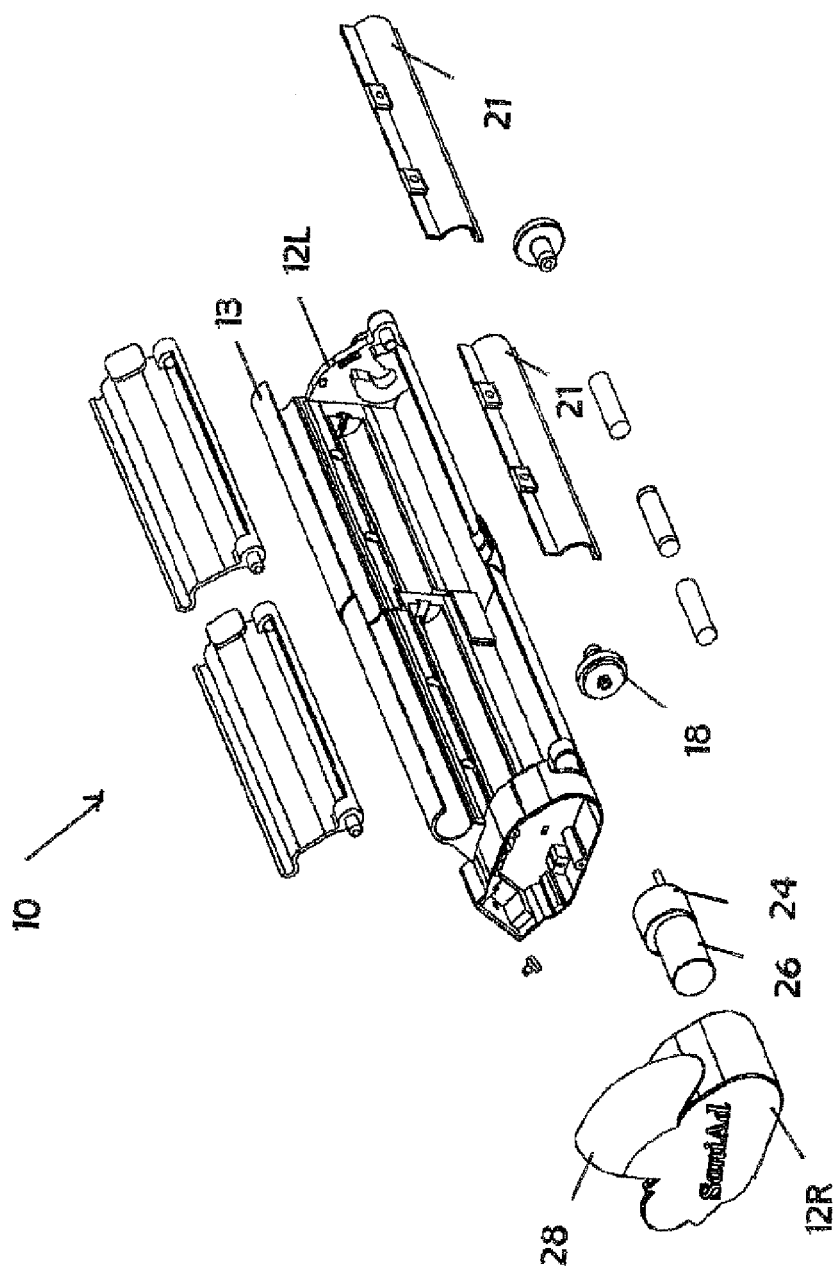
FIG. 10 is an exploded perspective view of the sanitary handle cover dispenser.
Figure 11:
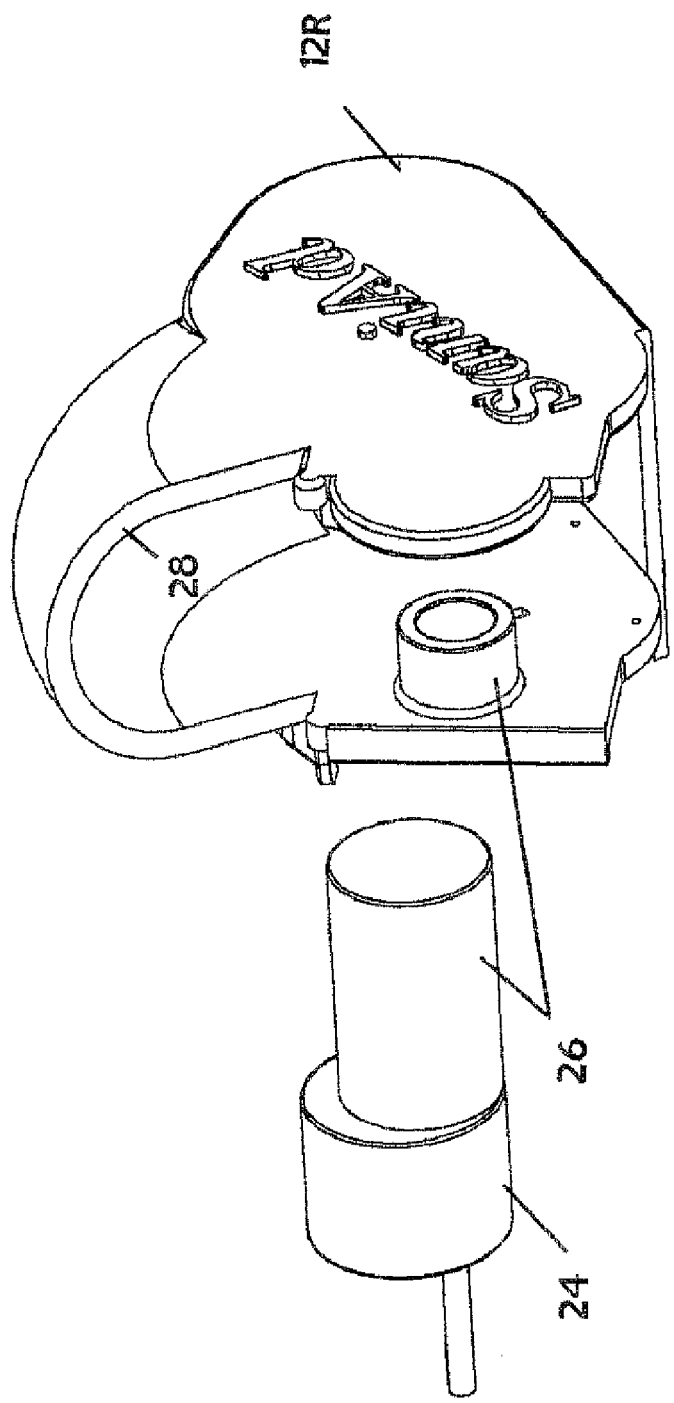
FIG. 11 is a detail exploded perspective view of the touch-free sensor for actuating sheet advance.

Sanitized sheet material 14 preferably comprises sanitized plastic sheet material, however, paper, or any other suitable sheet material is considered within the scope of the present invention. As best seen in FIGS. 8 and 9, one significant aspect of the present invention involves providing sanitized sheet material 14 adapted with advertising content. More particularly, the present invention contemplates selling advertising space on the sheet like material such that businesses may have advertising content printed directly on the sheet material and thus in plain view of the user. As the sheet material is advanced, new advertising content will be displayed. Accordingly, the present invention thus provides a means for displaying and changing advertising content.

FIG. 1 is a perspective view of a sanitary handle cover dispenser for use with a conventional shopping cart in accordance with the present invention. In a preferred embodiment, housing 12 forms a generally hollow body having opposing left and right sides, referenced as 12L and 12R. Housing 12 is preferably adapted with a C-shaped clip 13 sized for clipped connection to the handle of a shopping cart. As should be apparent a sanitary handle cover dispenser housing 12 may thus be removably connected to a shopping cart by engagement of C-shaped clip 13 as best seen in FIGS. 5-9. While the preferred embodiment depicts use of a C-shaped clip for affixing housing 12 to a shopping cart, the present invention contemplates any suitable alternate means of attachment as being within the scope of the present invention.

Figure 4:
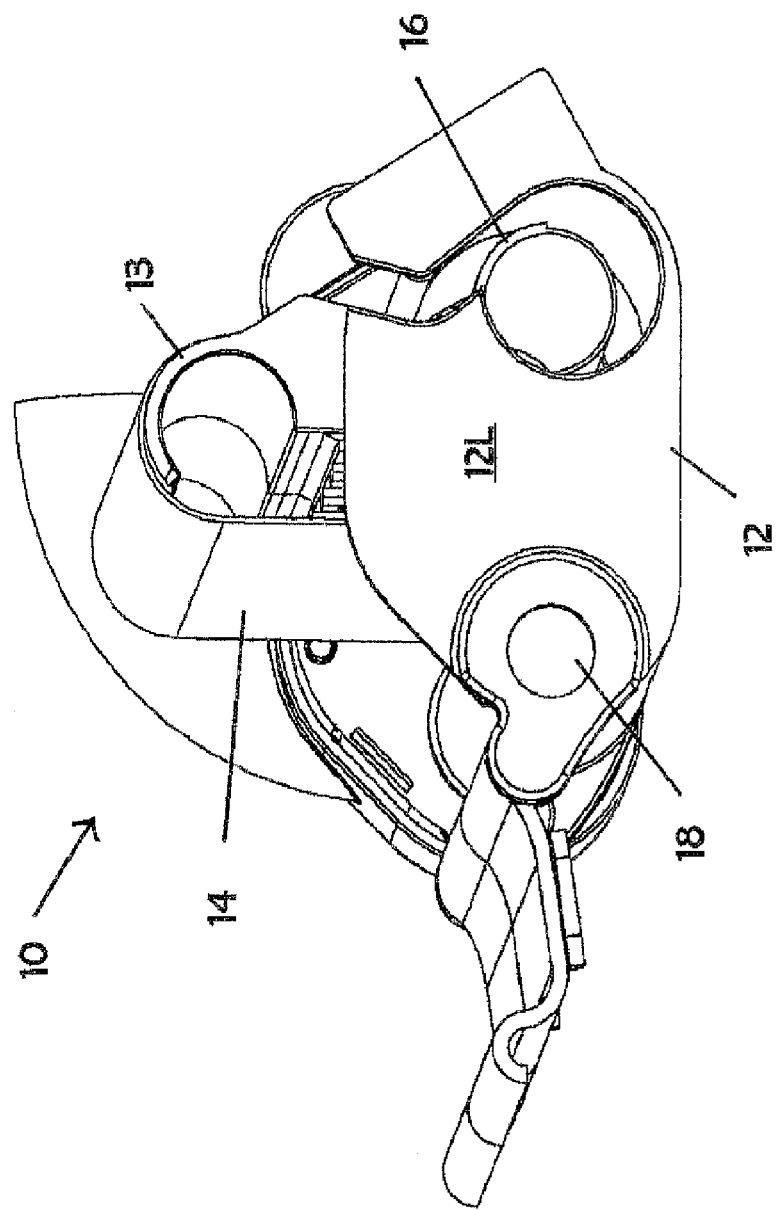
FIG. 4 is a side view thereof.
Figure 5:
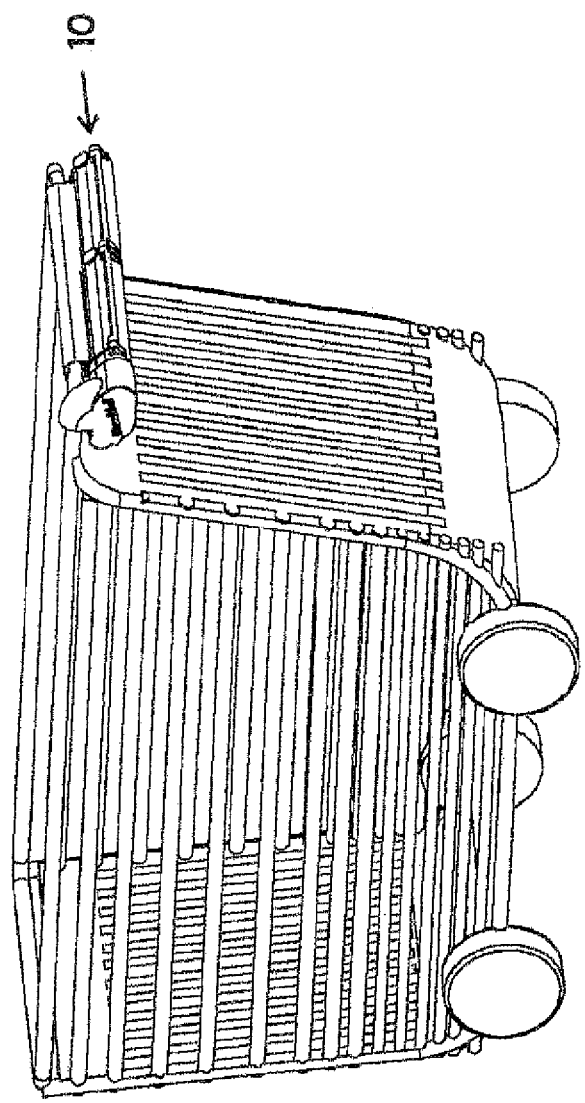
FIG. 5 shows a shopping cart adapted with a sanitary handle cover dispenser in accordance with the present invention.

As best depicted in FIG. 4, housing 12 contains internal bays for housing a supply reel 16 and a receiving reel 18, each of which is sized to receive sanitized sheet material 14 wound thereon. Supply reel 16 is preferably a refillable reel for sheet material 14 that may be insertedly mounted within housing 12 by insertion within a side opening defined in housing 12L with the sheet material 14 dispensed through an slotted opening in the housing top, routed over the curved outer surface of C-shaped clip 14 in covering relation with the shopping cart handle, and back into the housing for attachment to receiving reel 18. Receiving reel 18 is preferably a rotatable reel for receiving sheet material 14 dispensed from supply reel 16.

Figure 6:
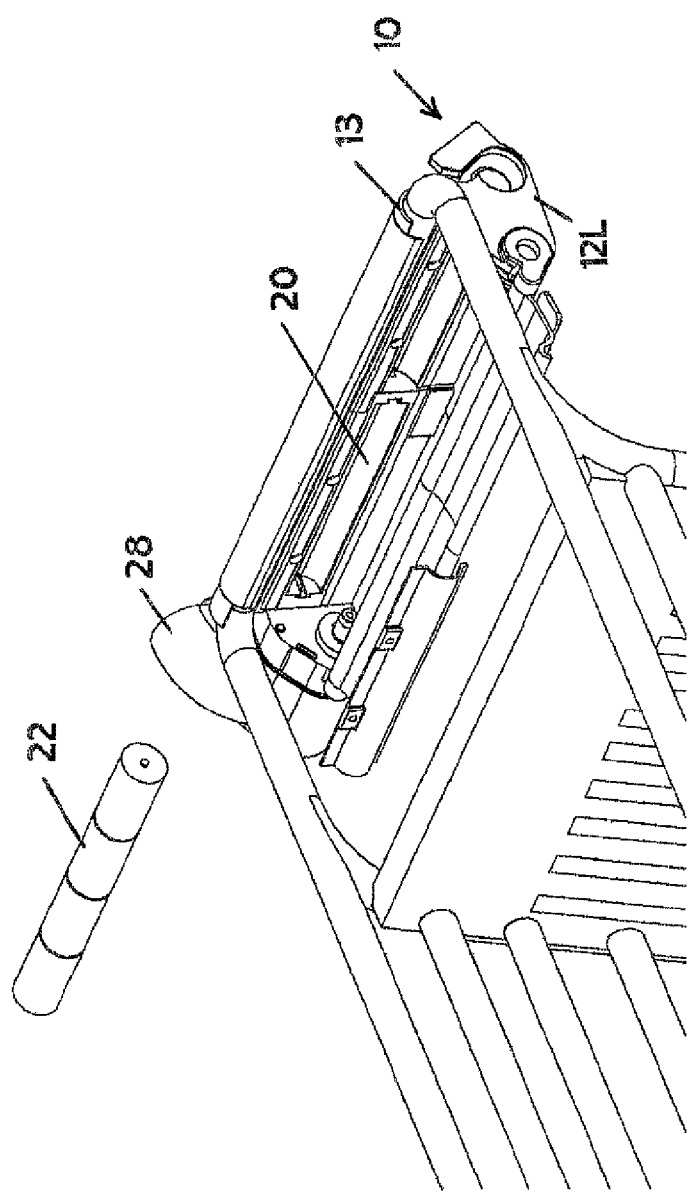
FIGS. 6-8 are partial detail views thereof.

A further significant aspect of the present invention relates to providing a sanitary handle cover dispenser wherein sanitary sheet material is advanced by a battery powered motor driven touch-free dispensing system. More particularly, as best seen in FIG. 6, housing 12 contains a battery compartment 20 and cover 21 for receiving a plurality of batteries 22 for powering an electric motor 24. Batteries 22 are preferably conventional size "C" batteries and may be replaceable or rechargeable. Batteries 22 are electrically connected to an electric motor 24 having an output shaft mechanically connected to receiving reel 18. As best seen in FIGS. 10-13, activation of electric motor 24 is controlled by a touch free sensor 26 mounted within a sensor housing 28 defined on the right side 12R of housing 12. Sensor housing 28 defines a generally vertical opening of suitable size to allow for a portion of the user's hand to pass through to trigger sensor 26. Sensor 26 is preferably an optical sensor that is triggered when the user's hand passes through sensor housing 28 and past sensor 26 without touching, e.g. touch-free. Sensor 26 is electrically connected to electric motor 24 and suitable electronic control circuitry so as to cause motor 24 to activate for a predetermined period of time so as to cause rotation of receiving reel 16 sufficiently to advance one sheet from supply reel 16. Sensor 26 is recessed within sensor housing 28 to prevent unintended advancement of sheet 14 when a person simply passes closely by the shopping cart. As should be apparent, the advancement of sheet material not only provides a fresh sanitized sheet in covering relation with the shopping cart handle, but further advances the advertising content thereby presenting the user with fresh advertising.

Figure 15:
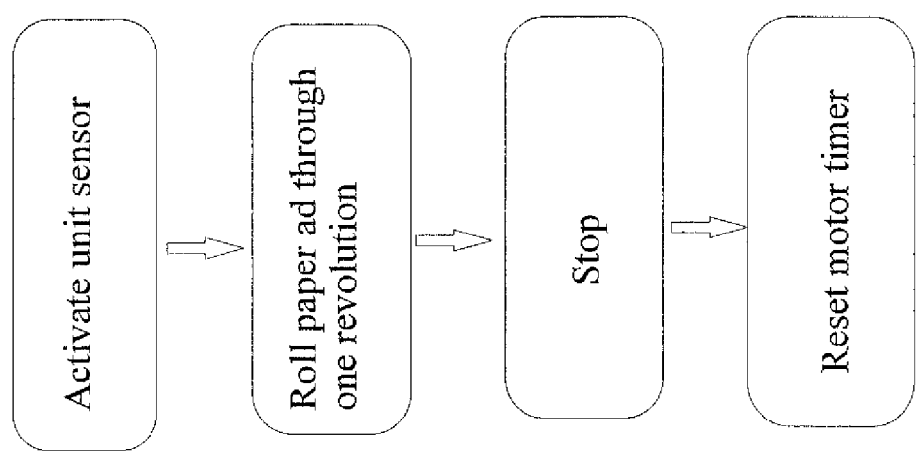
FIG. 15 is a flowchart depicting sheet advance logic.
Figure 16:
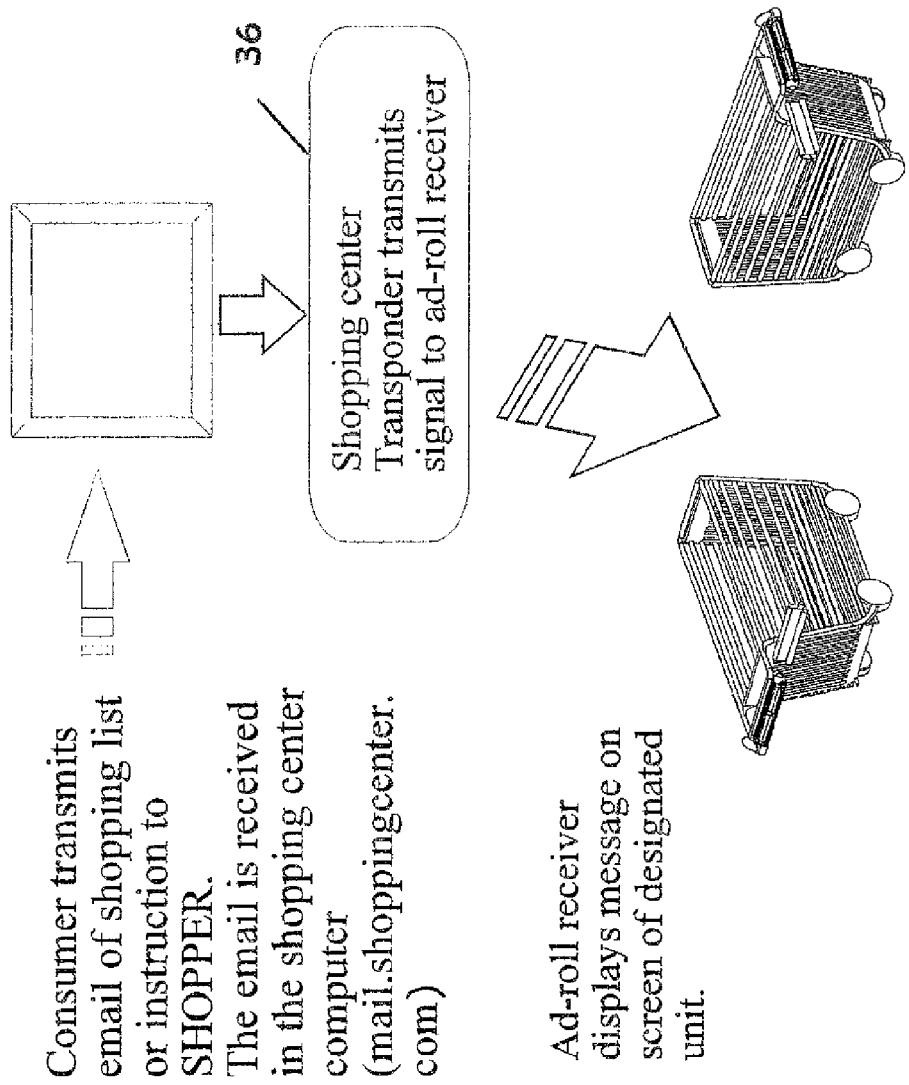
FIGS. 16 and 17 illustrate information flow enabled by wireless communication.
Figure 17:
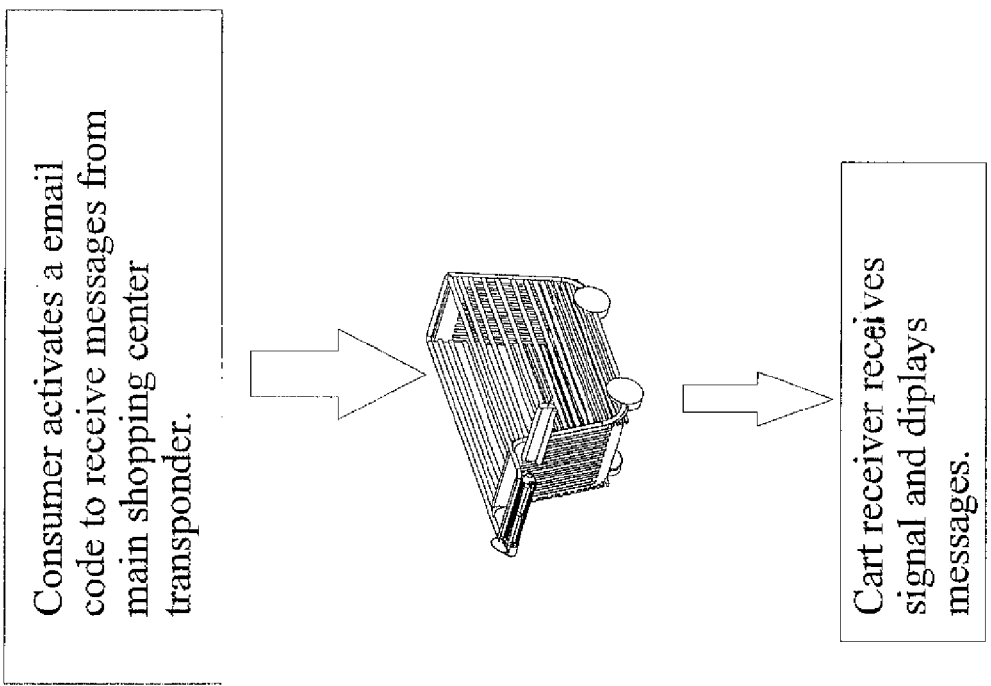

As should now be apparent the present invention is utilized by first installing batteries 22 into compartment 20 and affixing battery cover 21 using suitable fasteners. Next housing 12 is connected to a shopping cart by engagement of C-shaped clip 13 with the shopping cart handle. A supply roll 16 of sanitized sheet material is installed in housing 12 and routed over C-shaped clip 13 for attachment to receiving roll 18. The sanitized sheet material may by selectively advanced by the user by simply passing a portion of his hand into sensor housing 28 and past sensor 26 thereby causing actuation of motor 24 which drives receiving reel 18 for a predetermined period of time so as to draw sheet material from supply reel 18 as illustrated in FIG. 15.

Figure 7:
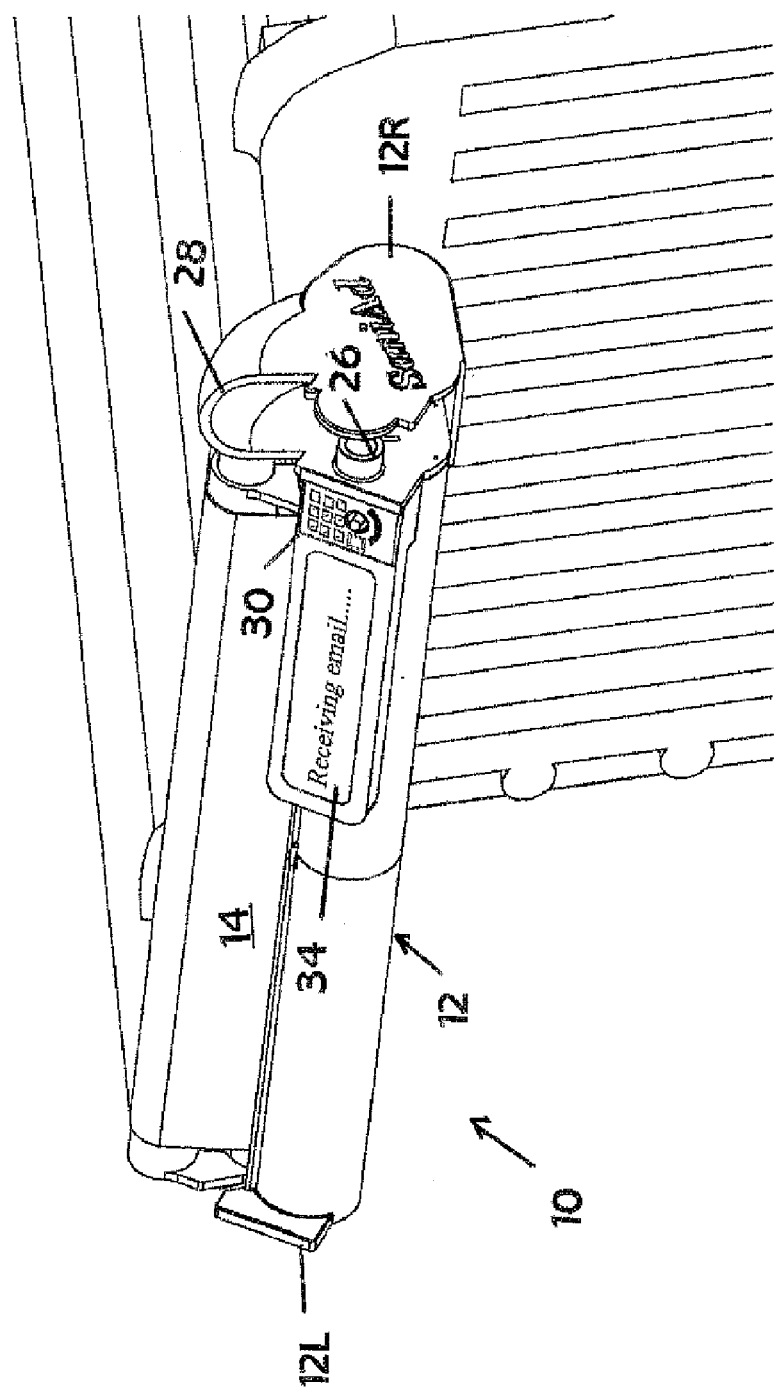
Figure 12:
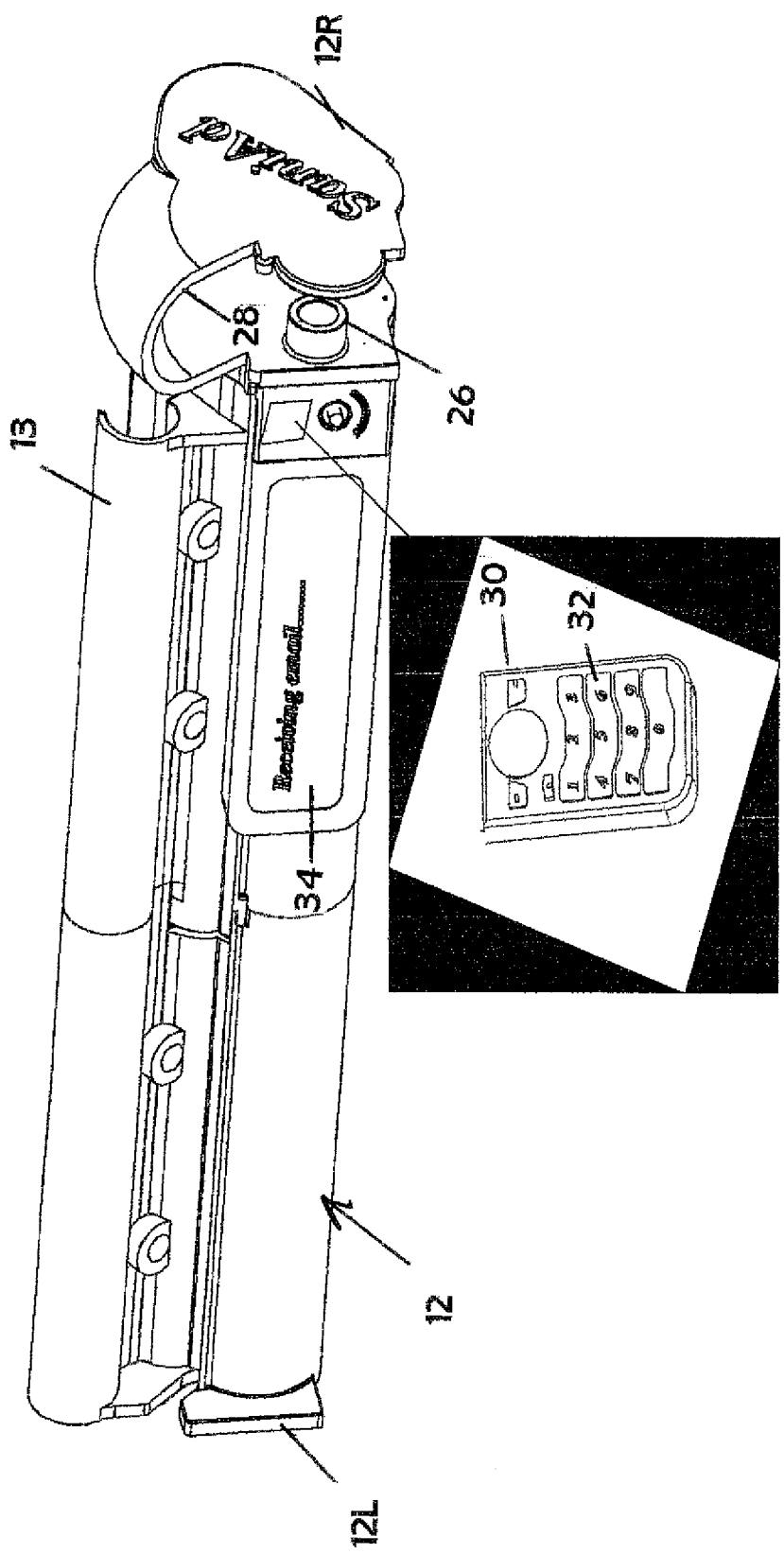
FIG. 12 is a front view of the dispenser providing a detailed view of the keypad.
Figure 13:
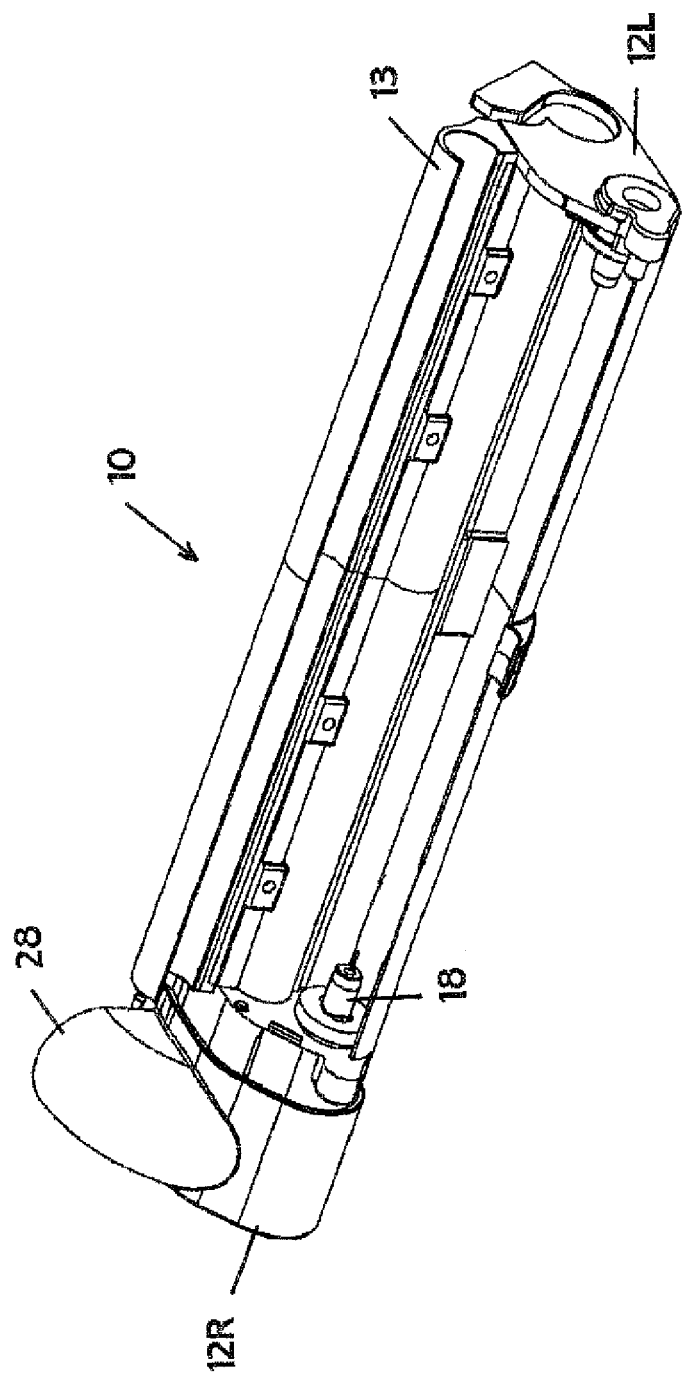
FIG. 13 is a rear view of the dispenser.
Figure 14:
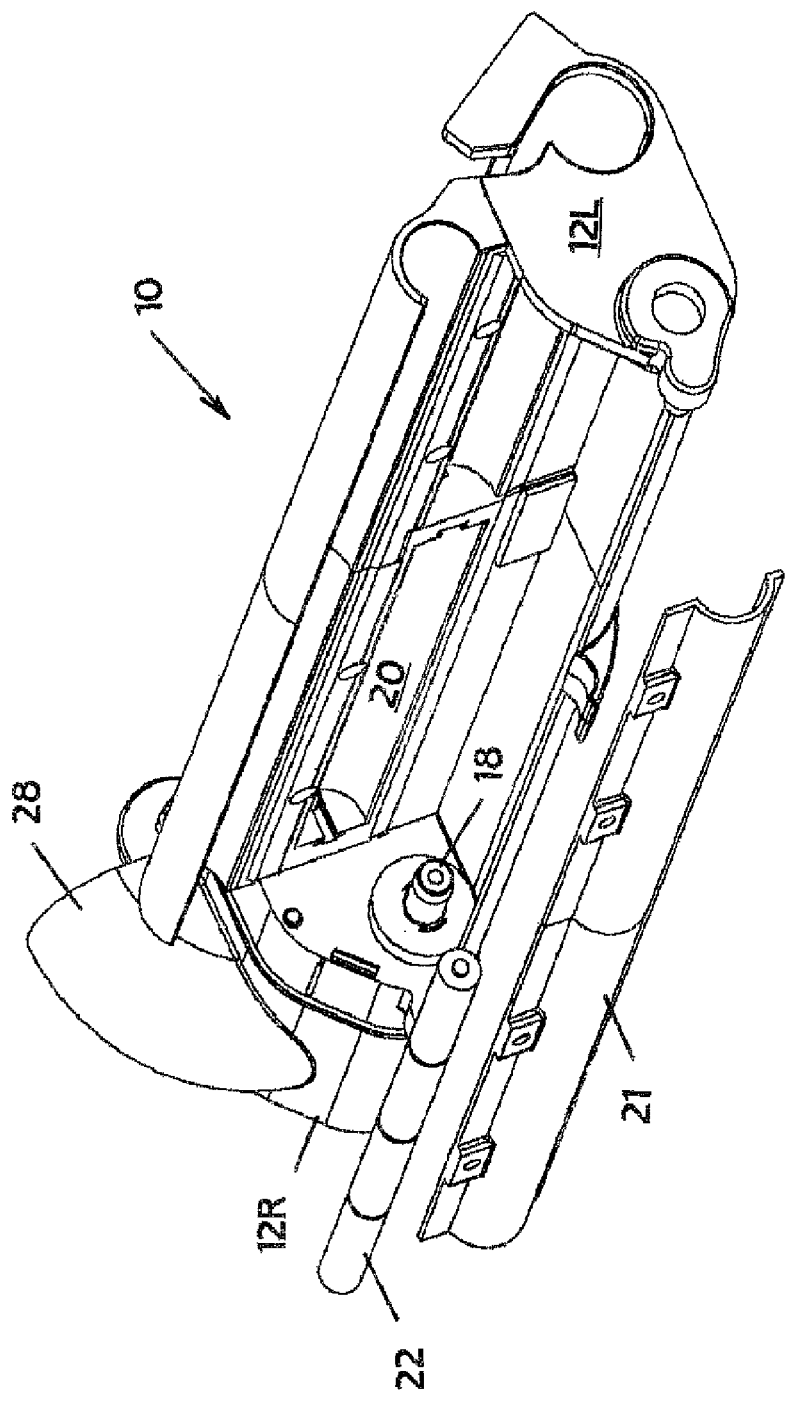
FIG. 14 is an exploded rear view thereof.

A further significant aspect of the present invention involves providing an alternate embodiment sanitary handle cover dispenser adapted with wireless communications to enable a user to transmit information from a remote location for reception by a particular dispenser apparatus the user will use when shopping. In accordance with this embodiment, housing 12 is further adapted with a wireless communications device 30, keypad 32, and an electronic display 34 as best seen in FIGS. 7 and 12. As further illustrated in FIG. 16, these devices function to enable the user to transmit a shopping list or other instructions via e-mail to a grocery store computer connected to the Internet. Once received, a transponder 36 transmits a signal that may be received by wireless communications. The user may access the information contained in his e-mail message by entering a personal identification number (PIN) using keypad 32 whereby the message will be displayed on the electronic display 34 on the designated dispensing unit 10.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A sanitary handle cover dispensing apparatus for use with a shopping cart to dispense sheet-like sanitary material in covering relation with the shopping cart handle, said apparatus comprising:
   a housing adapted for connection to the handle of a shopping can;
   said housing containing sheet-like material having a first end connected to a supply reel and a second end connected to a receiving reel with a portion of said sheet-like material in covering relation with the shopping cart handle when said housing is connected thereto;
   means for touch-free selective advance of said sheet-like material from said supply reel to said receiving reel such that a fresh portion of said sheet-like material advances to cover the shopping can handle;
   said means for touch-free selective advance including a battery power source, an electric motor in electrical communication with said battery power source, and a sensor configured to energize said electric motor for a predetermined period of time when triggered by the user so as to advance said sheet-like material from said supply reel to said receiving reel;
   said sensor being recessed within said housing within a generally vertically disposed opening such that said sensor is aligned toward a portion of said housing wall in spaced relation with said sensor whereby said sensor is triggered upon insertion of the user's hand within said housing between said sensor and said portion of said housing wall.

2. A sanitary handle cover dispenser for use with a shopping cart according to claim 1, wherein said sheet-like material includes a plurality of sections, each of said sections including advertising content printed thereon.

3. A sanitary handle cover dispenser for use with a shopping cart according to claim 1, wherein said sheet-like material includes perforations sized and spaced to allow the user's fingers to penetrate said sheet-like material.

4. A sanitary handle cover dispensing apparatus for use with a shopping cart to dispense sanitary sheet-like material in covering relation with the shopping cart handle, said apparatus comprising:
   a housing adapted for connection to the handle of a shopping cart;
   a supply reel rotatably connected to said housing, said supply reel including a refillable supply of sheet-like material wound thereon;
   a receiving reel rotatably connected to said housing, said receiving reel having an end portion of said sheet-like material connectable thereto;
   said sheet-like material routed from said supply reel to said receiving reel in covering relation with the shopping cart handle when said housing is connected to the shopping cart; and
   means for touch-free advancement of said sheet-like material from said supply reel to said receiving reel such that a fresh portion of sheet-like material advances in covering relation with said shopping cart handle;
   said means for touch-free advance including a battery power source, an electric motor in electrical communication with said battery power source, and a sensor configured to energize said electric motor for a predetermined period of time when triggered by the user so as to advance said sheet-like material from said supply reel to said receiving reel;
   said sensor mounted within a recess formed in said housing and with said sensor facing a interior portion of said housing in spaced relation with said sensor such that said sensor is recessed within said housing within a generally vertically disposed opening, said opening sized to allow for insertion of at least a portion of the user's hand between said sensor and said interior portion of the housing spaced from said sensor to allow the user to trigger said sensor.

5. A sanitary handle cover dispensing apparatus for use with a shopping cart according to claim 4, wherein said sheet-like material having advertising content printed thereon, whereby advancing of said sheet-like material functions to change the advertising content displayed.

6. A sanitary handle cover dispensing apparatus for use with a shopping cart according to claim 4 further adapted with a wireless communications device to enable aid dispensing apparatus to receive wireless communications, a keypad to enable a user to enter a PIN number, and an electronic display to enable said dispensing apparatus to display wireless communications transmitted by the user from a remote location upon entering a corresponding PIN number.

* * * * *